United States Patent [19]
Carlson

[11] Patent Number: 5,054,593
[45] Date of Patent: Oct. 8, 1991

[54] ELECTROPHORETIC FLUID TORQUE TRANSMISSION APPARATUS AND METHOD

[75] Inventor: J. David Carlson, Cary, N.C.

[73] Assignee: Lord Corporation, Erie, Pa.

[21] Appl. No.: 463,245

[22] Filed: Jan. 10, 1990

[51] Int. Cl.$^5$ .............................................. F16D 27/00
[52] U.S. Cl. .................................. 192/21.5; 188/267; 192/84 E
[58] Field of Search ................ 192/21.5, 84 E, 103 F; 188/267; 464/29

[56] References Cited

U.S. PATENT DOCUMENTS

| | | | |
|---|---|---|---|
| 2,745,527 | 5/1956 | Winther | 192/21.5 |
| 2,804,955 | 9/1957 | Gill, Jr. | 192/21.5 |
| 2,818,148 | 12/1957 | Winther | 192/21.5 |
| 2,839,170 | 6/1958 | Grant | 192/21.5 |
| 2,870,888 | 1/1959 | Gill, Jr. | 192/21.5 |
| 2,967,980 | 1/1961 | Ovshinsky | 192/21.5 |
| 2,996,162 | 8/1961 | Lehde | 192/21.5 |

Primary Examiner—Allan D. Herrmann
Assistant Examiner—Andrea Pitts
Attorney, Agent, or Firm—David L. McCombs; W. Graham Buie

[57] ABSTRACT

An electrophoretic fluid torque transmission apparatus and method in which cooperable electrodes are connected respectively to drive and driven elements. An electrophoretic fluid capable of separating into particle-rich and particle-deficient phases by electrophoresis operates in surface contact with the electrodes. An electrically non-conductive material having raised surface areas and spaces between the surface areas is associated with one or more of the electrodes. When a voltage is applied between the electrodes in a first direction, the particle-rich phase of the fluid collects on one of the electrodes and also makes contact with the spaces and the raised surface areas of the material associated with the other electrode thereby engaging or locking the electrodes together and transmitting force between the elements. When the voltage potential is applied in the opposite direction, the particle-rich phase migrates to the other electrode and collects in the spaces between the raised surfaces of the material, thereby disengaging the electrodes and preventing the transmission of force between the elements. The apparatus may be configured as a clutch, brake or differential.

19 Claims, 6 Drawing Sheets

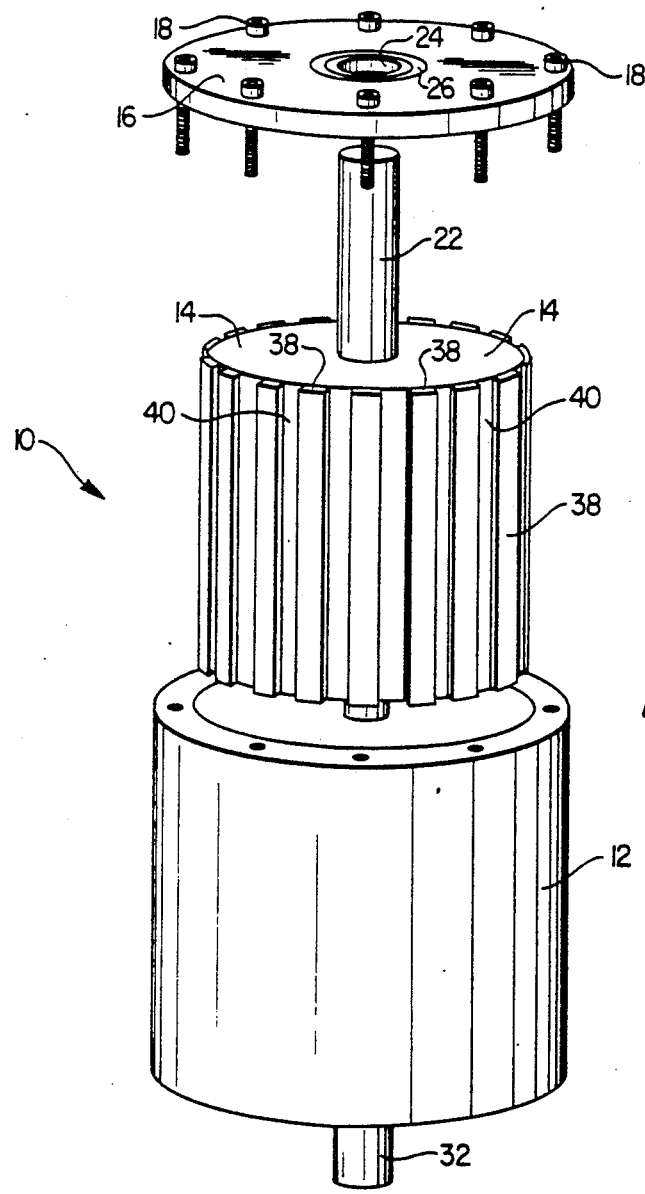
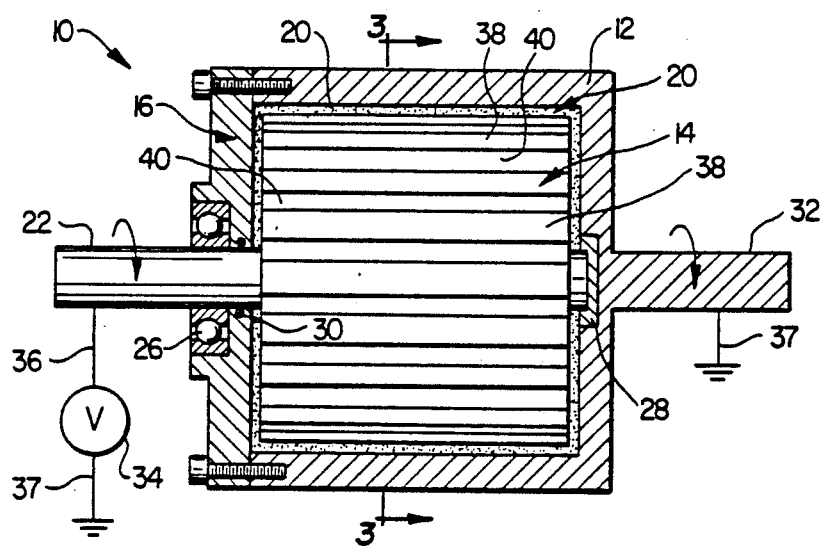
FIG. 1
FIG. 2

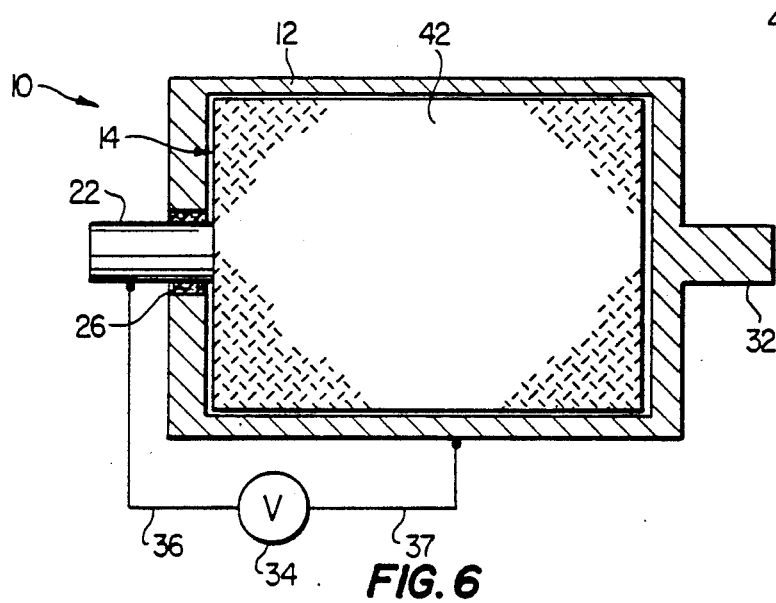
FIG. 6
FIG. 6a
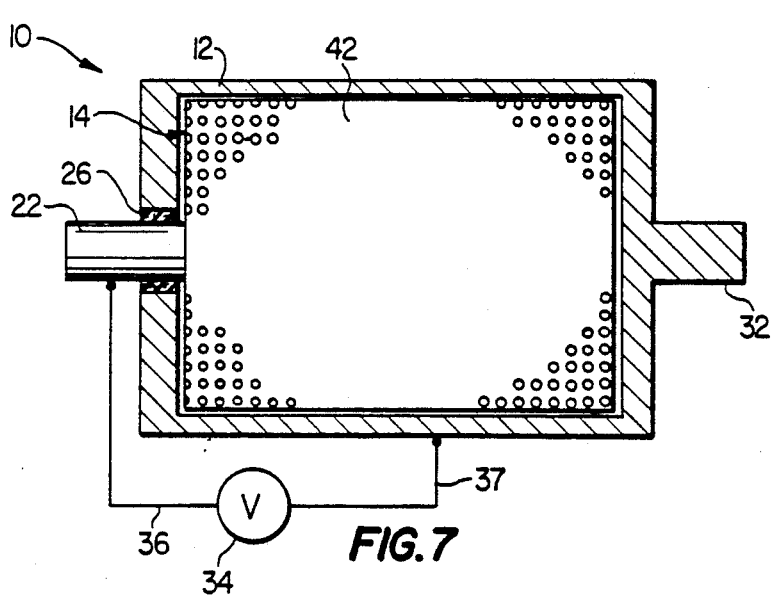
FIG. 7
FIG. 7a
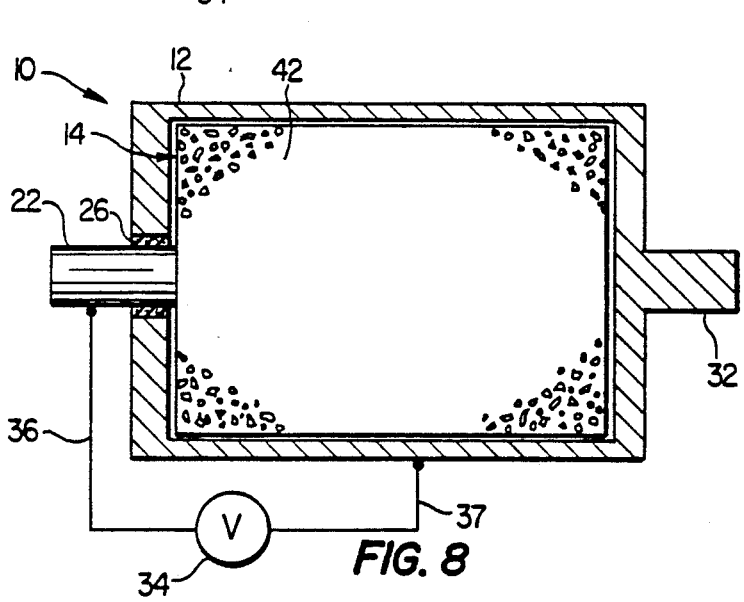
FIG. 8
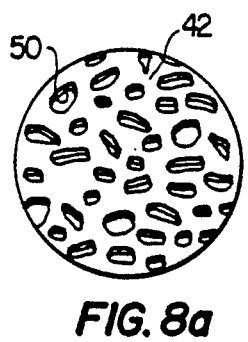
FIG. 8a

ELECTROPHORETIC FLUID TORQUE TRANSMISSION APPARATUS AND METHOD

FIELD OF THE INVENTION

The present invention relates in general to a force transmission and conversion apparatus and method and, more particularly, provides an improved torque coupling apparatus and method which uses an electrophoretic fluid.

BACKGROUND OF THE INVENTION

Various types of electroactive fluids have been developed which consist of suspensions of very fine particles in a dielectric liquid media. Electroactive fluids experience changes in their properties in the presence of an electric field, and for this reason are useful in a wide variety of mechanical treatments. One type of electroactive fluid is an electrorheological or "electroviscous" fluid. Electrorheological fluids are electroactive fluids which, in absence of an electric field, exhibit Newtonian flow characteristics such that their shear rate is directly proportional to shear stress. However, when an electric field on the order of $10^3$ V/mm is applied, a yield/stress phenomenon occurs such that no shearing takes place until the shear stress exceeds a yield value which rises with increasing electric field strength. The result can appear as an increase in apparent viscosity of several orders of magnitude. Many commercially realizable systems employing electrorheological fluids have been developed which include variable clutch or brake assemblies. While electrorheological fluid clutches are beneficial in providing for rapid and reversible response characteristics with typical response times being on the order of one millisecond, the torque limits of electrorheological fluid devices are constrained by the voltage potential and interactive surface area required for their adequate performance.

Another type of electroactive fluid is an electrophoretic or "electroseparatable" fluid. Electrophoretic fluids are suspensions similar to electrorheological fluids but are characterized by a very different response to an applied electric field. The particles within electrophoretic fluids exhibit a very strong electrophoretic migration. Rather than forming, in the presence of an electric field, a fibrillated structure that has an induced yield strength, electrophoretic fluids separate into particle-rich and particle-deficient phases by electrophoresis. Generally, the electrophoretic induced separation may be accomplished and maintained at much lower electric fields, since electrophoresis is a linear phenomenon with respect to electric field strength. On the other hand, the strength of an electrorheological fluid varies with the square of the electric field because of the dependence on induced dipole interactions for the electrorheological effect.

Because electrophoretic fluids operate in a substantially different manner from electrorheological fluids in the presence of an electric field, their use in existing electrorheological fluid clutches and other devices would not be functional in many instances. One viscous coupling arrangement which is constructed to use an electrophoretic fluid is disclosed in Klass, et al., U.S. Pat. No. 3,255,853. The disclosed device provides for modulation in the viscosity of the electrophoretic fluid between opposing rotating elements. A viscous drag is provided by the fluid in suspension when no power is applied. Upon actuation of an electric field, the suspended particles migrate to one of the moving elements so as to lower the viscosity of the remaining fluid between the moving elements. The return of the device to the higher viscosity state relies on the fluid being re-mixed to a homogeneous suspension when the electric field is deactivated. The particle-rich phase is therefore not utilized in a manner to achieve an engagement or restriction of movement between the coupling members. For this reason, the coupling force which may be achieved is relatively low.

SUMMARY OF THE INVENTION

It is therefore an object of the present invention to provide an improved torque coupling apparatus and method which utilizes an electrophoretic fluid.

It is a further object of the present invention to provide an apparatus and method of the above type in which a particle-rich phase of the electrophoretic fluid produced by an electric field may be utilized to effect engagement between electrodes for sustaining forces or torques between members to be coupled.

It is a still further object of the present invention to provide an apparatus and method of the above type in which raised surfaces formed of an insulating material having spaces or openings therein are positioned between the electrodes for either receiving or engaging the particle-rich phase depending on the polarity of the electric field between the electrodes.

Toward the fulfillment of these and other objects, a torque transmission and conversion apparatus is provided which is controlled by the application of an electric field to an electrophoretic fluid. The apparatus may be configured as a clutch, brake, differential or other torque coupling assembly and includes cooperable electrodes which are connected respectively to drive and driven elements. An electrophoretic fluid operates in surface contact with the electrodes and is capable of separating into particle-rich an particle-deficient phases by electrophoresis. Control of this process is used to reversibly "jam" or lodge the particle-rich phase of the fluid between relatively moving components of the device for selectively coupling the drive an driven elements.

An electrically nonconductive material having raised surface areas and spaces between the surface areas is associated with one or more of the electrodes of the device for effecting the coupling action between the electrodes. When an electric field is applied between the electrodes in a first direction, the particle-rich phase of the fluid collects on one of the electrodes and also makes contact with the spaces and the raised surface areas of the material associated with the other electrode, thereby engaging or "locking" the electrodes together. When the polarity of the applied electric field is reversed, the particle-rich phase migrates to the other electrode by electrophoresis and collects in the spaces between the raised surface areas of the material, thereby disengaging the electrodes. The direction and intensity of the applied electric field may be varied for controlling the sequence and degree of coupling between the electrodes.

BRIEF DESCRIPTION OF THE DRAWINGS

For a better understanding of the invention, reference may be made to the following description of exemplary embodiments taken in conjunction with the figures of the accompanying drawings, in which:

FIG. 1 is an exploded, perspective view of a clutch apparatus of the present invention;

FIG. 2 is a front elevational view, with a portion in section, depicting the clutch apparatus of FIG. 1;

FIG. 6 is a front elevational view similar to FIG. 2, but depicting another alternative embodiment of the clutch apparatus of the present invention;

FIG. 6a an enlarged view of the encircled portion of the rotating member of FIG. 6;

FIG. 7 is a front elevational view similar to FIG. 2, but depicting another alternative embodiment of the clutch apparatus of the present invention;

FIG. 7a an enlarged view of the encircled portion of the rotating member of FIG. 7;

FIG. 8 is a front elevational view similar to FIG. 2, but depicting another alternative embodiment of the clutch apparatus of present invention;

FIG. 8a is an enlarged view of the encircled portion of the rotating member of FIG. 8;

DESCRIPTION OF THE PREFERRED EMBODIMENTS

Figure 4A:
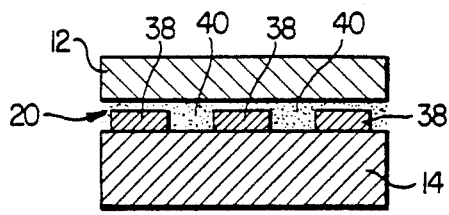
FIGS. 4a–4c are enlarged, cross-sectional, schematic views of a portion of the electrodes of the clutch apparatus of FIGS. 1–3 showing the operation of the electrophoretic fluid.

In FIG. 1 of the drawings, there is designated by the reference numeral 10 a clutch or similar device for the transmission and conversion of torque which employs features of the present invention. The clutch 10 may be used, for example, as a torque coupling device, brake, locking or disengagement device in a wide variety of applications. The clutch 10 includes an open-ended outer cylindrical housing 12 and an inner cylinder member 14. For the purpose of clearly illustrating these components the clutch 10 is shown disassembled in FIG. 1. It is understood that when assembled, an electrophoretic fluid (not shown) is enclosed within the housing 12, as will be subsequently discussed.

Figure 3:
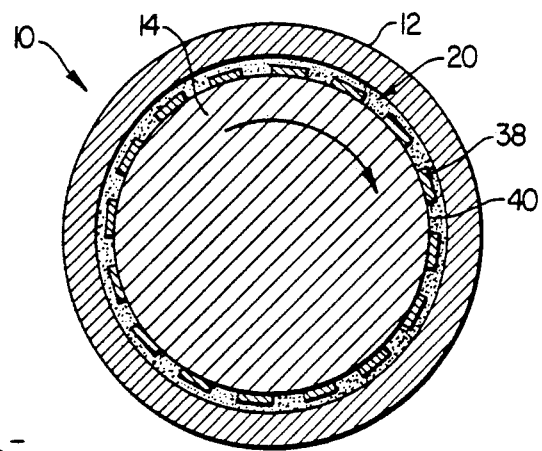
FIG. 3 is a cross-sectional view of the clutch apparatus of the present invention taken along line 3—3 of FIG. 2.

Referring to FIGS. 2 and 3, a cover 16 is provided for the open end of the housing 12 and is secured thereto by a plurality of threaded fasteners 18. The housing 12 and the cover 16 form an enclosed chamber which contains the member 14 and the electrophoretic fluid in the annular space between the member and the housing. The electrophoretic fluid is schematically represented by a dispersion of particles 20, as shown. A drive shaft 22 is connected to the member 14 and supports the member coaxially within the housing 12. The drive shaft 22 extends through a central opening 24 (FIG. 1) in the cover 16. A front bearing 26 and a rear bearing 28 support the drive shaft 22 for rotational motion of the member 14 with respect to the housing 12. A fluid seal 30 in the cover 16 prevents leakage of the electrophoretic fluid through the opening 24. A gasket or fluid seal (not shown) may also be provided between the housing 12 and the cover 16 to prevent leakage of fluid from the housing. A drive shaft 32 is also connected to the closed-end portion of the housing 12 in coaxial alignment with the shaft 22. The drive shafts 22 and 32 each may operate either as input or output drive shafts, according to the particular application. It should be noted that when the clutch 10 is utilized as a braking device, the housing 12 could be stationary without a drive shaft 32, or optionally, the housing 12 could be a drive element directly coupled to a drive belt or the like.

A power source 34 is connected by wires 36, 37 to the drive shafts 22, 32. The drive shafts 22, 32, the housing 12 and the member 14 are constructed of an electrically conductive material so that a voltage potential may be developed across the housing and the member. In this manner, the housing 12 and the member 14 function as electrodes and provide an electric field across the electrophoretic fluid in the annular space therebetween. In the preferred embodiment, the housing 12 is grounded and the inner cylinder member 14 is at either a positive or negative high voltage with respect to the housing 12, as determined by the power source 32. The cover 16 and the rear bearing 28 are constructed of electrically nonconducting material so that a voltage potential can be established and maintained between the housing 12 and the member 14. Alternatively, the cover 16 and the rear bearing 28 may be insulated electrically from the housing 12 by interposing a separate insulating material between the cover, the rear bearing and the housing 12.

A plurality of spaced, parallel ribs 38 are affixed to the member 14 and are constructed of a suitable nonconductive metal, plastic, ceramic, glass, epoxy or composite material. The ribs 38 prevent direct contact and electrical arcing between the housing 12 and the member 14. Importantly, the ribs 38 also provide for controlled engagement and disengagement between the housing 12 and the member 14 by the electrophoretic fluid, in a manner to be discussed. In some configurations, the ribs 38 may eliminate the need for the front bearing 26 and the rear bearing 28 since the ribs prevent direct contact between the inner cylinder 14 and the housing 12. A plurality of spaces 40 separate adjacent ribs 38. Both the ribs 38 and the spaces 40 are oriented longitudinally with respect to the axis of rotation of the member 14, so that their length is perpendicular to the direction of shear of the electrophoretic fluid during rotation of the member relative to the housing 12. The ribs 38 have a thickness relative to the surface of the member 14 which is typically a large fraction (e.g., 0.5-0.9) of the annular space between the member and the housing 12.

The electrophoretic fluid contained within the housing 12 generally comprises a carrier liquid containing a dispersed particulate material that experiences electrophoresis in the presence of an electric field. One example of an electrophoretic fluid is a commercial dispersion of polyvinylidene fluoride particles (PVF2) in dimethylphthalate and diisobutyl ketone. This is an example of a "positive" electrophoretic fluid, since the particulate material has a tendency to migrate to a positively charged electrode. Other electrophoretic fluid formulations are contemplated and may include "negative" electrophoretic fluids or "bipolar" electrophoretic fluids. Negative electrophoretic fluids are those in which the particulate material has a tendency to migrate to a negatively charged electrode. Bipolar electrophoretic fluids contain particulate material which tends to migrate to both positively charged and negatively charged electrodes, leaving the carrier liquid in the region therebetween. In bipolar electrophoretic fluids, each of the particles of the particulate material become electrically charged triboelectrically by rubbing against each other when they are mixed and sheared, such that equal numbers of positively charged and negatively charged particles result. For example, micron size polystyrene beads in ten centistoke silicone oil have been found to behave in this fashion.

During operation, the shafts 22, 32 of the clutch 10 are connected to drive elements (not shown). The drive elements each either transmit or receive, or alternately transmit and receive rotary mechanical forces, depending upon the application. Since the shafts 22, 32 are connected respectively to the member 14 and housing 12, the transmission of torque between the drive elements is regulated by control of the mechanical coupling between the member and the housing by the electrophoretic fluid.

Figure 4B:
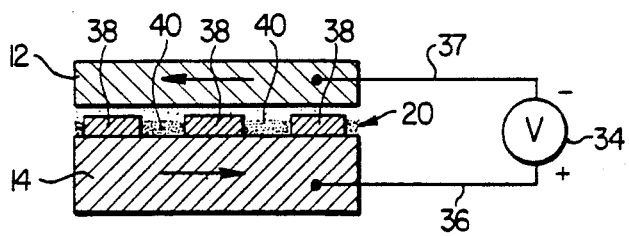
Figure 4C:
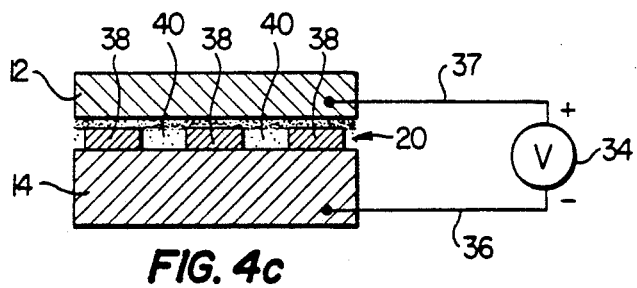

FIGS. 4a-4c schematically illustrate the use of the electrophoretic fluid in the annular space between the housing 12 and the member 14 to vary the degree of coupling between the housing and the member. As shown in FIG. 4a, the electrophoretic fluid exists as a fairly homogeneous suspension of the particles 20 between the housing 12 and the member 14 in the absence of an electric field. When rotation of the housing 12 relative to the member 14 is initiated, the housing and the member are coupled only to the extent provided by the shear strength of the electrophoretic fluid in its homogeneous, dispersed state. Depending on the particular application and the viscosity of the fluid used, the foregoing torque transmission between the drive elements (not shown) may be sufficient. For other applications, it may be desirable to more fully isolate (disengage) the drive elements. Alternatively, it may be desirable to increase the torque transmission between the drive elements or fully lock (engage) the drive elements.

In FIG. 4b, a voltage potential is applied to the electrophoretic fluid between the housing 12 and the member 14 by the power source 34 for more completely disengaging the housing relative to the member, and thus isolating the drive elements from the transmission of torque therebetween. The power source 34 applies a positive voltage to the member 14 so that the particles 20 (assuming a "positive" electrophoretic fluid) migrate by electrophoresis to the member. The electrophoretic fluid in this manner separates into a particle-rich phase and a particle-deficient phase as shown, where the particle-rich phase substantially fills the spaces 40 between the ribs 38. The particle-deficient phase is left to occupy the region between the raised surfaces of the ribs 38 and the housing 12. Because the particle-deficient phase is characterized by a reduced viscosity as compared to the fluid in the dispersed state (FIG. 4a), the member 14 and the housing 12 are relatively free to rotate with respect to each other unencumbered by significant viscous coupling.

In FIG. 4c, the polarity of the voltage applied by the power source 34 to the electrophoretic fluid between the housing 12 and the member 14 is reversed. Since the positive voltage is now applied to the housing 12, the particles 20 of the fluid migrate by electrophoresis to the housing. The particle-rich phase of the fluid collects on the housing 12, leaving the particle-deficient phase to occupy a portion of the spaces 40 in surface contact with the member 14. The particle-rich phase on the housing 12 also makes contact with the raised surfaces of the ribs 38 and "jams" or lodges in an outer portion of the spaces 40 between the ribs, thereby coupling the housing and the member 14. Thus, the electrophoretic fluid will engage or lock the housing relative to the member and operatively connect the drive elements (not shown). It is understood that the magnitude of the electric field generated by the power source 34 may be regulated to control the coupling force and thus the transmission and conversion of torque between the drive elements.

It should be noted that a relatively high magnitude electric field may be required to initially couple the drive elements but that a somewhat reduced magnitude electric field may be sufficient to maintain coupling of the drive elements.

The geometry of the ribs 38 and the spaces 40 may be alternatively configured according to the performance requirements of the clutch 10. The relative size and orientation of the ribs 38 and spaces 40, the applied voltage and the type of electrophoretic fluid used, may all be varied to meet particular system specifications. For example, the ribs and spaces need not be large. They may be very small, like the electrode patterns formed via vacuum thin film deposition techniques (masking, photolithography, photoetching, etc.) for application in reduced scale, fast devices. The spaces 40 themselves may also be recessed in the rotating member 14 to eliminate the necessity of providing for elevated ribs or for increasing the elevation of the ribs. The surface of the housing 12 opposite the ribs 38 may also be textured to enhance the locking strength of the particle-rich phase. In addition, the spacing or "gap" between the housing 12 and the member 14 may be varied. Where the spacing between the housing 12 and the member 14 is sufficiently large, the particle-rich phase collected on the housing may not be able to make contact with the surfaces of the ribs 38 and/or lodge in an outer portion of the spaces 40, thereby reducing the maximum force transmission which can be provided between the housing and member.

FIGS. 5-12 illustrate modifications to the clutch 10 in which the ribs 38 and the spaces 40 are replaced with alternative structure to operate in substantially the same manner as previously described with reference to FIGS. 4a-4c.

Figure 5:
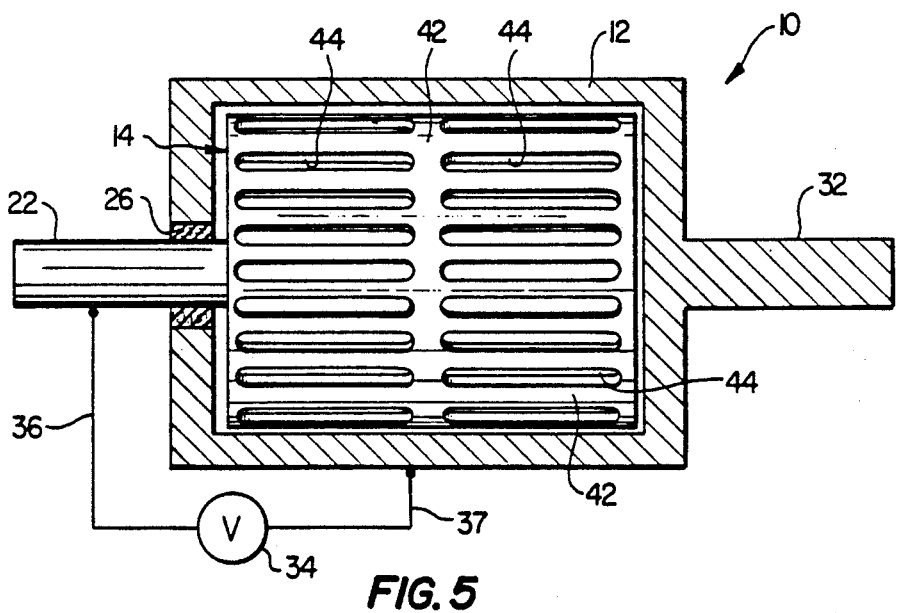
FIG. 5 is a front elevational view similar to FIG. 2, but depicting an alternative embodiment of the clutch apparatus of the present invention.

In FIG. 5, a continuous insulating layer 42 of a suitable nonconductive metal, plastic or composite material is affixed to the rotating member 14 of the clutch 10. The layer 42 may be applied to the member 14 by adhesion, painting, casting, dipping, anodizing, printing, chemical vapor deposition, sputtering, vacuum evaporation, plasma spray or other suitable process. A plurality of discontinuous grooves 44 are included in the layer 42 which extend to the surface of the member 14 beneath the layer. The grooves 44 are oriented longitudinally to the axis of rotation of the member 14. The grooves 44 may be preformed or formed by any variety of suitable techniques including machining, etching, grinding, drilling, etc. Although not shown, it is understood that, in operation, the particle-rich phase of the electrophoretic fluid will occupy the grooves 44 when attracted to the member 14. The particle-deficient phase therefore occupies the region between the housing 12 and the surfaces of the layer 42 which enhances disengagement of the member 14 relative to the housing. Similarly, when force transmission is desired and the voltage between the housing 12 and the member 14 is reversed (as previously described), the particle-rich phase will migrate toward the inner surface of the housing. The particle-rich phase of the fluid on the housing 12 also engages the raised surfaces of the layer 42 and lodges in the outer portion of the grooves 44, in a manner similar to that shown in FIG. 4c, for engagement of the member 14 relative to the housing.

In FIGS. 6 and 6a, the insulating layer 42 is affixed to the member 14 of the clutch 10, as described above. According to the embodiment of FIGS. 6 and 6a, a plurality of short grooves 46 are included in the layer 42 which extend to the surface of the member 14 beneath the layer. The grooves 46 are arranged in a generally criss-cross pattern and may be formed as previously described. The particle-rich phase of the fluid will occupy the grooves 46 when attracted to the member 14 for disengagement of the member 14 relative to the housing 12. Similarly, when force transmission is desired and the voltage potential between the housing 12 and the member 14 is reversed, the particle-rich phase of the fluid migrates to the inner surface of the housing. The particle-rich phase on the housing 12 also engages the raised surfaces of the layer 42 and lodges in an outer portion of the grooves 46, in a manner similar to that described, for engagement of the member 14 and the housing 12.

In FIGS. 7 and 7a, the insulating layer 42 is affixed to the member 14 of the clutch 10, as described above. According to this embodiment, a plurality of spaced circular holes 48 are included in the layer 42 which extend to the surface of the member 14 beneath the layer. The circular holes 48 may be arranged in any suitable pattern and varied in size as desired. Other uniform geometric shapes for the holes 48 are also contemplated. Although not shown, it is understood that the particle-rich phase of the fluid will occupy the holes 48 when attracted to the member 14 for disengagement of the member 14 relative to the housing 12. Similarly, when force transmission is desired the voltage potential between the housing 12 and the member 14 is reversed and the particle-rich phase migrates to the inner wall of the housing. The particle-rich phase of the fluid on the housing 12 also engages the raised surfaces of the layer 42 and lodges in an outer portion of the holes 48 for engagement of the member 14 relative to the housing.

In FIGS. 8 and 8a, the insulating layer 42 is also affixed to the member 14 of the clutch 10, as described above. According to the embodiment, a plurality of irregular holes 50 are included in the layer 42 which extend to the surface of the member 14 beneath the layer. The holes 50 may be formed by a course grit or blasting process that chips away small regions of the layer 42, or by other techniques as described previously. Although not shown, it is understood that the particle-rich phase of the fluid will occupy the holes 50 when attracted to the member 14 for disengagement of the member 14 relative to the housing 12. Similarly, when the voltage potential is reversed the particle-rich phase of the fluid will migrate to the inner wall of the housing 12. The particle-rich phase also engages the raised surfaces of the layer 42 and lodges in an outer portion of the holes 50 for engagement of the member 14 relative to the housing 12.

Figure 10:
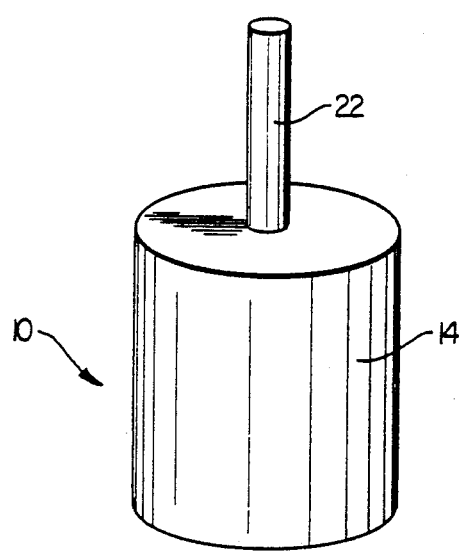
FIG. 10 is an overhead cross-sectional view of the clutch apparatus of FIG. 9.
Figure 10:
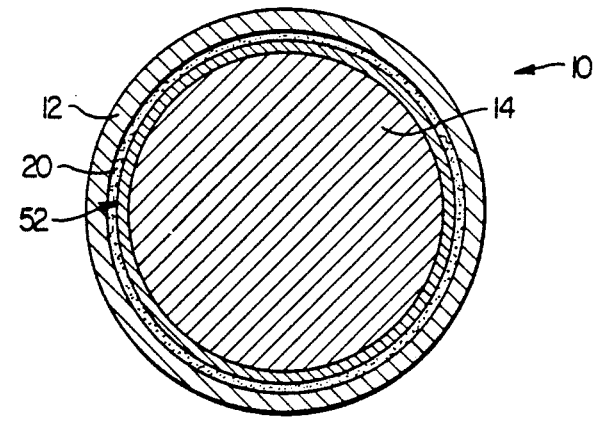
Figure 9:
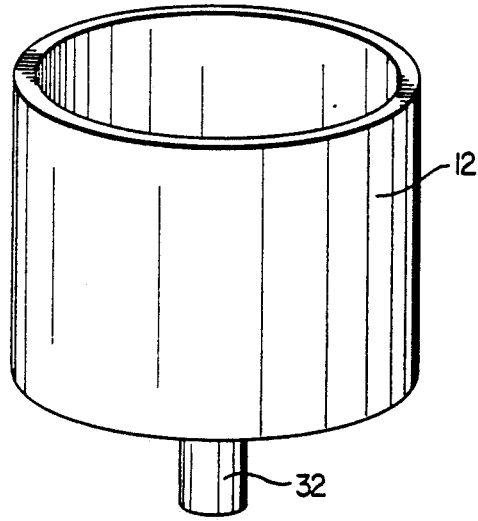
FIG. 9 is an exploded, perspective view of another alternative embodiment of the clutch apparatus of the present invention in which the rotating member includes a grid formed of an insulating material.

In FIGS. 9 and 10, there is depicted an insulating grid 52 which may be separately formed of a single piece or mesh of insulating material and then fitted over the member 14 of the clutch 10. The clutch 10 is shown disassembled in FIG. 9 in order to clearly illustrate the grid 52. The grid 52 is constructed of a suitable nonconductive material having a plurality of holes 54 extending therethrough. The holes 54 may be formed by perforating the grid 52 or may be defined when the grid is made from a woven, open weave fabric or screen. A variety of sizes, arrangements and patterns for the holes 54 are contemplated. It is understood that the grid 52 may be either flexible or rigid and is affixed to the member 14 by gluing, adhesive bonding, mechanical attachment, press fit or other means. Although not shown, during operation, the particle-rich phase of the fluid will occupy the holes 54 when attracted to the member 14 for disengagement of the member relative to the housing 12. When force transmission is desired, the polarity of the voltage potential is reversed and the particle-rich phase of the fluid migrates to the inner wall of the housing 12. The particle-rich phase on the housing 12 also engages the grid 52 and lodges in an outer portion of the holes 54 for engagement of the member 14 relative to the housing.

Although not shown in the drawings, it is contemplated that for each of the described embodiments of the clutch 10, the ribs 38, the insulating layer 42 or the grid 52 may alternatively be affixed to the inner wall of the housing 12, or rigidly supported in the space between the housing and the member 14 and connected in a spaced relationship to either the housing or the member.

Figure 11:
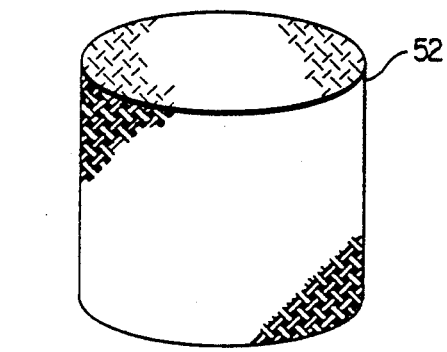
FIG. 11 is a vertical cross-sectional view of another alternative embodiment of the clutch apparatus of the present invention in which the rotating member includes a grid formed of an insulating material supported in a spaced relationship from the member.
Figure 11:
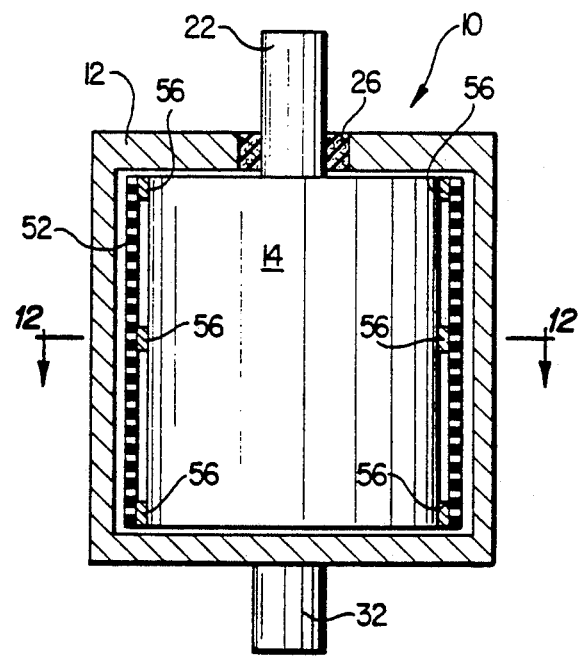
Figure 12:
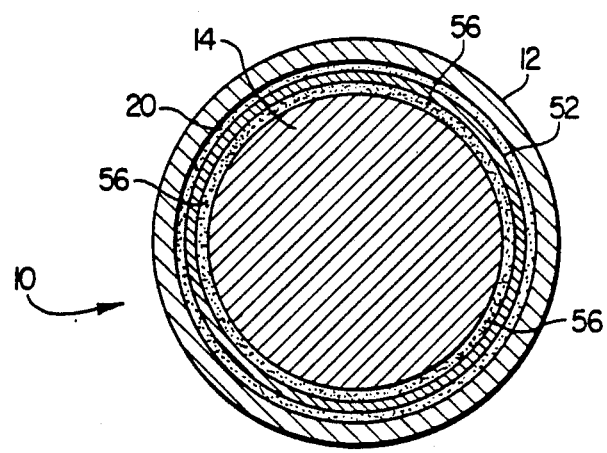
FIG. 12 is an overhead cross-sectional view of the clutch apparatus taken along line 12—12 of FIG. 11.

In FIGS. 11 and 12, for example, the grid 52 of the clutch 10 is spaced between the housing 12 and the member 14 and is supported by retaining members 56 which rigidly connect the grid to the member 14. Since the grid 52 is spaced away from the member 14, additional room is provided for the particle-rich phase of the fluid to occupy the annular space between the grid and the member for improved disengagement of the clutch 10. Thus, as shown in FIG. 12, when the particle-rich phase of the fluid is attracted to the member 14, the particles 20 will pass through the holes 54 of the grid 52 and fill the annular space between the grid and the member, and the particle-deficient phase of the fluid will fill the annular space between the grid and the housing 12, for disengagement. Although not shown, when the polarity of the voltage potential between the housing 12 and the member 14 is reversed so that the particle-rich phase collects on the housing, a portion of the particle-rich phase on the housing will make contact with the raised surfaces of the grid 52 and will lodge in at least an outer portion of the holes 54 thus engaging the housing and grid. Since the grid 52 is attached by the members 56 to the member 14, the clutch 10 is engaged.

Figure 13:
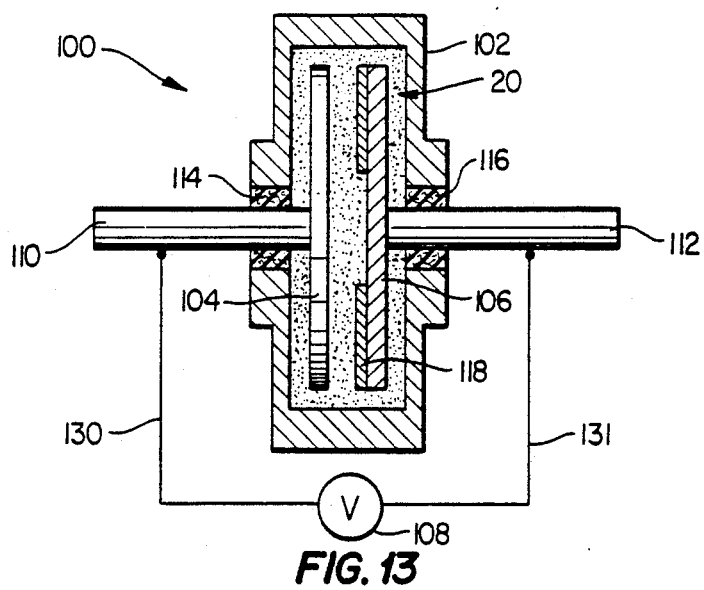
FIG. 13 is a front elevational view in partial cross-section depicting a disc-type clutch apparatus of the present invention.
Figure 14:
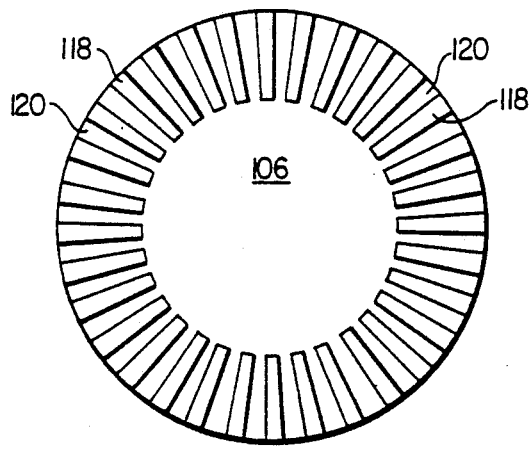
FIG. 14 is an enlarged end view of the right electrode plate of the disc-type clutch apparatus of FIG. 13.

Referring now to FIGS. 13 and 14 of the drawings, the reference numeral 100 refers to an alternative electrophoretic fluid clutch embodying principles of the present invention. The clutch 100 includes a housing 102, parallel, opposing electrode plates 104 and 106, and a power source 108. Although not shown in the drawings, the clutch 100 may be supported in a suitable manner and connected to drive elements (also not shown) for the transmission and conversion of torque therebetween.

An electrophoretic fluid (previously described an schematically illustrated in FIG. 13 by the particles 20) is enclosed within the housing 102. Shafts 110 and 112 are connected respectively to each of the electrode plates 104, 106. Seal bearings 114 and 116 support the respective shafts 110, 112 for rotation and prevent leakage of the electrophoretic fluid from the housing 102. The plates 104, 106 are axially spaced within the housing 102 and are free to rotate relative to the housing. Wires 130, 131 electrically connect the power source 108 to each of the shafts 110, 112. Since the shafts 110, 112 are electrically conductive, the power source 108 is able to generate a voltage potential between the plates 104, 106 and thus apply a variable and reversible electric field to the electrophoretic fluid between the plates.

A plurality of ribs 118 are affixed to the surface of the electrode plate 106 and are constructed of a suitable nonconductive metal, plastic or composite material. The ribs 118 prevent direct contact and electrical arcing between the plates 104, 106. The ribs 118 also provide for controlled engagement and disengagement between the plates 104, 106 by the electrophoretic fluid, in a manner to be discussed. A plurality of spaces 120 separate the ribs 118. The ribs 118 each extend radially from the center of the plate 106 so that each is oriented generally perpendicular to the direction of shear of the fluid as the plate rotates relative to the housing 102. The ribs have a thickness relative to the surface of the plate 106 which is a large fraction (e.g., 0.5–0.9) of the space between the plates 104, 106.

Although the housing 102 is shown in the drawing cast as a single piece, it is understood that the housing may be constructed in a manner to provide for facilitated assembly of the clutch 100 and improved access to its internal components.

During the operation of the clutch 100, the shafts 110, 112 are each connected to the drive elements (not shown). The transmission of torque between the elements is regulated through the control of the mechanical coupling between the electrode plates 104, 106 by the electrophoretic fluid in a manner similar to that described with reference to FIGS. 4a–4c.

The electrophoretic fluid exists as a homogeneous suspension of the particles 20 in the absence of an applied electric field between the plates 104, 106. Thus, when no electric potential is provided by the power source 108, the shafts 110, 112, connected to the drive elements (not shown), are relatively uncoupled and free to rotate with respect to each other. The electrode plates 104, 106 are, however, subject to the viscous drag provided by the electrophoretic fluid in the dispersed phase within the housing 102.

A voltage potential may be applied between the plates 104, 106 by the power source 108 in order to improve the disengagement between the plates, and thus isolate the drive elements (not shown) from the transmission of torque therebetween. Assuming a positive electrophoretic fluid is contained within the housing 102, the application of a positive voltage to the plate 106 will cause the particles 20 to migrate by electrophoresis to the plate 106. The fluid in this manner separates into particle-rich and particle-deficient phases in which the particle-rich phase collects on the electrode 106 and substantially fills the spaces 120 between the ribs 118. The particle-deficient phase is left to occupy the region between the raised surfaces of the ribs 118 and the electrode 104. Because the particle-deficient phase is characterized by a reduced viscosity as compared to the fluid in the dispersed state, the plates 104, 106 are relatively free to rotate with respect to each other unencumbered by significant viscous coupling.

The polarity of the voltage n applied between the plates 104, 106 by the power source 108 may be reversed for engaging or locking the plates 104, 106 relative to one another and thus operatively coupling the drive elements (not shown). When the positive voltage is applied to the plate 104, the particles 20 of the fluid migrate by electrophoresis to the plate 104. The particle-rich phase thus collects on the plate 104 leaving the particle-deficient phase to occupy a portion of the spaces 120 in surface contact with the plate 106. The particle-rich phase on the electrode 104 also makes contact with the raised surfaces of the ribs 118 and lodges in the outer portion of spaces 120 between the ribs, thereby engaging the plates 104, 106. The magnitude of the electric field generated by the power source may be regulated to control the coupling and thus the transmission and conversion of torque between the elements.

Although not shown in the drawings, it is understood that the geometry of the ribs 118 and spaces 120 may be alternatively configured according to the performance requirements of the clutch 100. The relative size and orientation of the ribs 118 and spaces 120, the annular spacing between the housing 12 and the member 14, the applied voltage and the type of electrophoretic fluid used, may all be varied to meet system specifications. Further, the ribs 118 may be replaced with an insulating layer or grid configured in a manner similar to the embodiments previously discussed. The ribs, insulating layer or grid may be affixed to either of the plates 104, 106, or spaced between them and connected in a suitable manner to one or the other of the plates.

Figure 15:
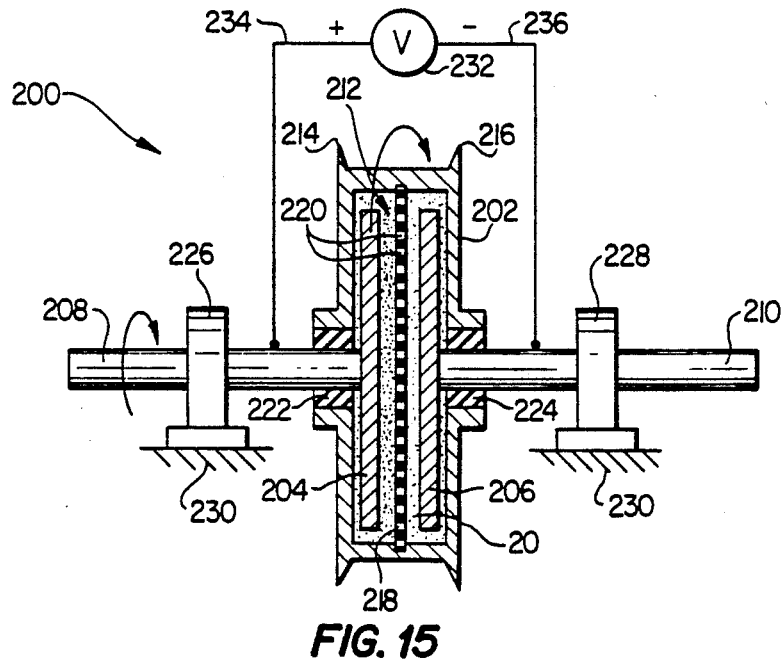
FIG. 15 is a front elevational view in partial cross-section depicting a differential apparatus of the present invention.

Referring now to FIG. 15, a rotary motion differential generally designated by the numeral 200 is illustrated which embodies principles of the present invention. The differential 200 includes a primary member 202, electrode plates 204 and 206, and drive shafts 208 and 210 connected respectively to the electrode plates. The differential 200 allows for the selective coupling of rotary mechanical motion between the primary member 202 and one or both of the drive shafts 208, 210. The differential 200 has application for use in torque transmission systems, vehicle power trains, motion distribution systems and braking systems, etc.

The primary drive member 202 defines an enclosed chamber 212 for containing an electrophoretic fluid (previously discussed and schematically illustrated by the particles 20). The member 202 is shown as a rotatable belt drive pulley in which extended flanges 214, 216 are provided about each peripheral edge thereof, to ensure proper alignment and engagement of a belt or other drive means (not shown). It is understood that the member 202 could also be a gear, friction drive or a part of a motor. A nonconductive porous grid 218 is included in the chamber 212. The grid 218 is placed between the plates 204, 206 and is rigidly connected to the member 202. A plurality of holes 220 are defined in the grid. The holes 220 are sufficiently large to permit the particles 20 of the electrophoretic fluid to pass through the holes under the action of an electric field, as will be discussed.

The electrode plates 204, 205 connected to the respective shafts 208, 210 are axially spaced within the chamber 212 and may rotate relative to one another and relative to the member 202. Seal bearings 222, 224 support the respective shafts 208, 210 relative to the member 202. The seal bearings 222, 224 also prevent leakage of the electrophoretic fluid from the chamber 212. Pillow blocks 226 and 228 support the respective shafts 218, 220 and the member 202 relative to a surface 230.

A power source 232 is connected by wires 234, 236 to the respective shafts 208, 210. Since the shafts 208, 210 are electrically conductive, the power source 232 may apply a variable and reversible voltage potential between the plates 204, 206 for generating an electric field across the electrophoretic fluid in the space between the plates.

During operation of the differential 200, the primary drive member 202, the shaft 208 and the shaft 210 are each operatively connected to drive elements (not shown). The transmission of torque between the member 202 and one or both of the shafts 208, 210 is regulated through control of the mechanical coupling between the member and each of the plates 204, 206 by the electrophoretic fluid.

As previously mentioned, the electrophoretic fluid exists as a homogeneous suspension of the particles 20 in the absence of an applied electric field between the plates 204, 206. Thus, when no voltage potential is provided by the power source 232, the member 202 and the shafts 208, 210 are relatively uncoupled and are free to rotate with respect to each other, subject only to the viscous drag provided by the electrophoretic fluid in the dispersed phase within the chamber 212.

As shown in FIG. 15, a voltage potential may be applied between the plates 204, 206 by the power source 232 in order to engage or lock the member 202 relative to the plate 204. In this manner the drive element (not shown) connected by a pulley or other means (also not shown) to the member 202 will be operatively coupled to the drive element (not shown) connected to the shaft 208. Assuming a positive electrophoretic fluid is contained in the chamber 212, the application of a positive voltage to the plate 204 will cause the particles 20 to migrate by electrophoresis to the plate 204. The fluid is thus separated into particle-rich and particle-deficient phase in which the particle-rich phase collects on the plate 204 and fills the space between the plate and the grid 218. The particle-rich phase also makes contact with the grid 218 and lodges in the holes 220. Since the grid 218 is rigidly connected to the member 202, the member, the plate 204 and the shaft 208 are operatively coupled for the transmission of torque between the two associated drive elements (not shown). Since the particle-deficient phase of the fluid occupies the space between the plate 206 and the grid 218, the grid and the plate 206 are disengaged and the member 202 is not operatively coupled with the shaft 210. The magnitude of the electric field generated by the power source 218 may be regulated to control the coupling and thus the transmission and conversion of torque between the two elements.

Although not shown in the drawings, it is understood that the polarity of the voltage applied between the plates 204, 206 by the power source 218 may be reversed, for instead operatively coupling the member 202 and the plate 206 in the same manner as just described.

In order to operatively couple the primary drive member 202 to both of the shafts 208, 210 simultaneously, a bipolar electrophoretic fluid (as previously described) may be used in the operation of the differential 200. Although not shown, the particles 20 of the bipolar electrophoretic fluid will migrate by electrophoresis to both of the plates 204, 206 in the presence of an electric field. The polarity of the voltage potential may be in either direction or produced with alternating current (A.C.). The particle-rich phase of the fluid thus collects on each of the plates 204, 206. A portion of the particle-rich phase associated with each of the plates 204, 206 makes contact with the grid 218 and lodges in the holes 220, thereby coupling the grid to both of the plates.

Figure 16:
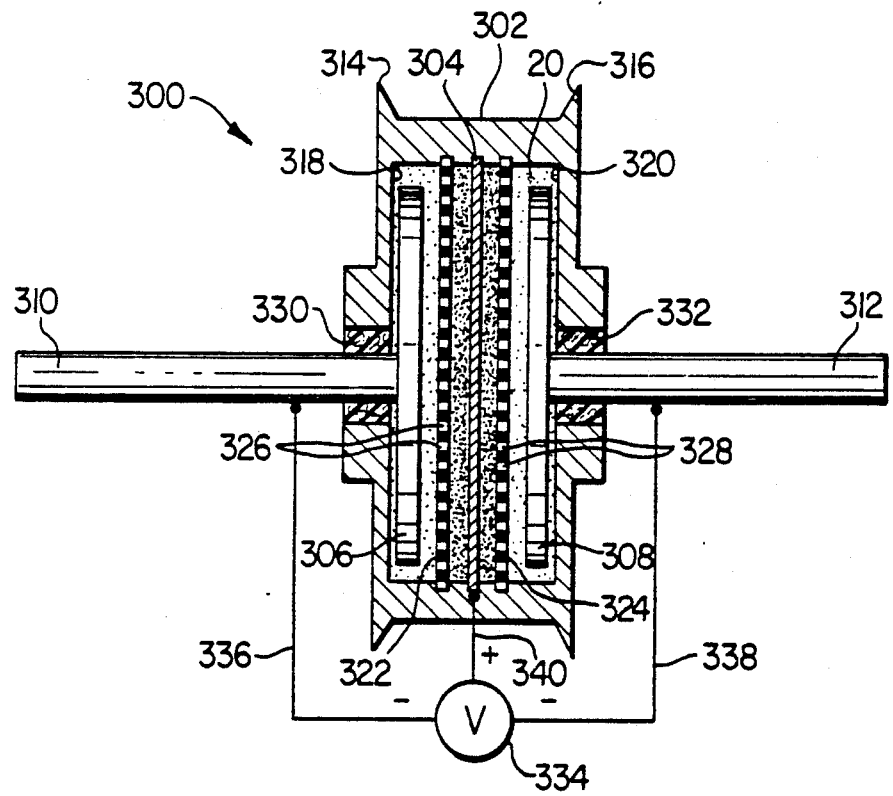
FIG. 16 is a front elevational view in partial cross-section depicting an alternative differential apparatus of the present invention having a central electrode and showing the electrode plates in the engaged state.
Figure 17:
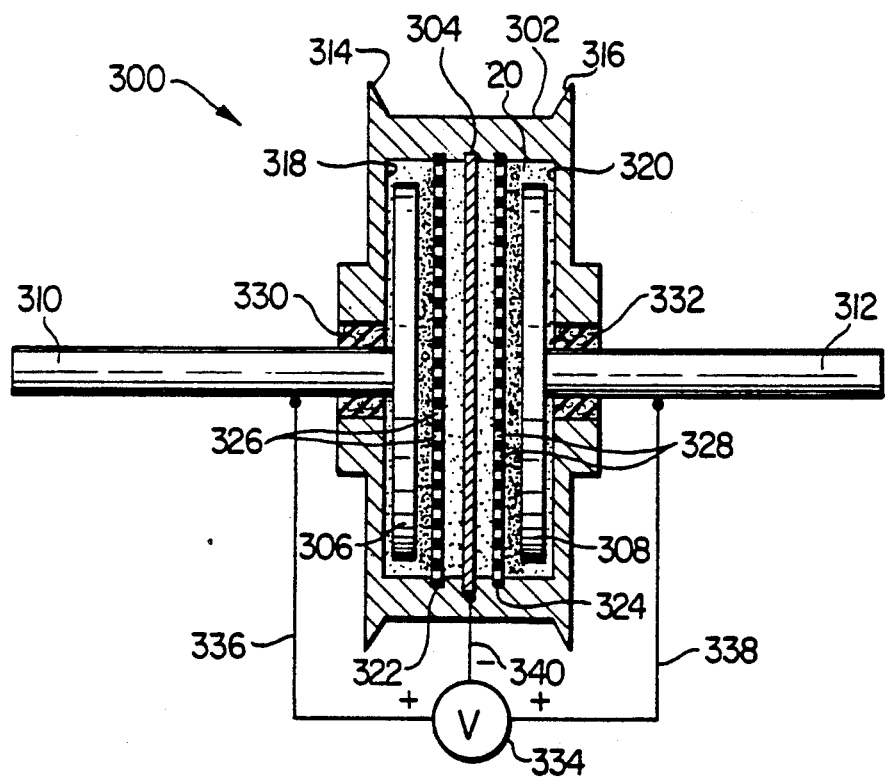
FIG. 17 is a front elevational view in partial cross-section depicting the diffential assembly of FIG. 16 in which the electrode plates are in the disengaged state.

FIGS. 16 and 17 illustrate an alternative embodiment for a rotary motion differential according to the present invention which is generally designated by the numeral 300. The differential 300 includes a primary drive member 302, a central electrode 304, electrode plates 306, 308 and drive shafts 310, 312 connected respectively to the electrode plates. The differential 300 allows for the selective coupling of rotary mechanical motion between the member 302 and one or both of the shafts 310, 312. The differential 300 may be operated to provide improved disengagement and engagement of the member 302 relative to both of the shafts 310, 312 simultaneously.

The member 302 is shown as a rotatable drive pulley having extended flanges 314, 316 provided about the peripheral edge thereof, to ensure proper alignment of a belt or other drive means (not shown). Two enclosed chambers 318, 320 are defined within the member 302 and are separated by the central electrode 304. The chambers 318, 320 contain the electrophoretic fluid (previously described and schematically illustrated by the particles 20). The electrode plates 306, 308 are axially spaced and contained within the respective chambers 318, 320. Two nonconductive porous qrids 322, 324 are also included within the respective chambers 318, 320 between the central electrode 304 and each of the plates 306, 308. The grids 322, 324 are rigidly connected to the member 302. A plurality of holes 326, 328 are formed in the respective grids 322, 324. The holes 326, 328 are sufficiently large to permit the particles to pass through the holes under the action of an electric field, as will be discussed.

The plates 306, 308 connected to the respective shafts 310, 312 may rotate relative to one another and relative to the member 302. Seal bearings 330, 332 support the shafts 310, 312 relative to the member 302 and prevent leakage of the fluid from the chambers 318, 320. Although not shown in the drawings, the shafts 310, 312 may be supported by suitable means similar to that shown in FIG. 14.

A power source 334 is connected by wires 336, 338 and 340 to the shafts 310, 312 and the electrode 304, respectively. Since the shafts 310, 312 are electrically conductive, the power source 334 may apply a variable and reversible voltage potential between the electrode 304 and each of the plates 306, 308.

During operation of the differential 300, the member 302, the shaft 310 and the shaft 312 are each operatively connected to drive elements (not shown). The transmission of torque between the member 302 and one or both of the shafts 310, 312 is regulated through the control of the mechanical coupling between the member and each of the plates 306, 308 by the electrophoretic fluid.

In the absence of an electric field, the electrophoretic fluid exists as a homogeneous suspension of the particles within the chambers 318, 320. The member 02 and the plates 306, 308 are relatively uncoupled and free to rotate with respect to each other, and are subject only to the viscous drag provided by the fluid in the dispersed phase.

As shown in FIG. 16, a voltage potential may be applied between the electrode 304 and the plates 306, 308 by the power source 334 in order to improve the disengagement between the member 302 and both of the plates 306, 308. Assuming a positive electrophoretic fluid is contained within the chambers 318, 320, a positive voltage applied to the electrode 304 will cause the particles 20 to migrate by electrophoresis to the electrode 304. The particle-rich phase collects on the surfaces of the electrode 304 in the spaces between the grids 322, 324. The particle-deficient phase occupies the spaces between each of the grids 322, 324 and the respective plates 306, 308, thereby leaving the plates relatively free to rotate with respect to each other unencumbered by significant viscous coupling.

While not shown, it is understood that the voltage potential may be alternatively applied to only one of the plates 306, 308 in order to improve disengagement with respect to that plate only.

As shown in FIG. 17, a voltage potential may be applied between the electrode 304 and the plates 306, 308 by the power source 334 in order to lock or engage the member 302 relative to the plates 306, 308. The application of a positive voltage potential to the plates 306, 308 will cause the particles to migrate by electrophoresis to the plates. The particle-rich phase collects on the plates 306, 308 and fills the spaces between the plates and the grids 322, 324. A portion of the particle-rich phase makes contact with the raised surfaces of the grids 322, 324 and lodges in the hole 326, 328 of the grids, thereby engaging the grids and the plates 306, 308. The magnitude of the electric field generated by the power source 334 may be regulated to control the coupling and thus the transmission of torque between the drive elements (not shown).

While not shown, it is understood that the voltage potential may be applied between the electrode 304 and only one of the plates 306, 308 for engaging just that plate and the corresponding drive element (not shown).

The described torque transmission and conversion devices employing features of the present invention may be used for a wide variety of applications and are representative embodiments only. A latitude of modification, change and substitution is therefore intended in the foregoing disclosure and in some instances, some features of the invention will be employed without a corresponding use of other features. Accordingly, it is appropriate that the appended claims be construed broadly and in a manner consistent with the scope of the invention.

What is claimed is:

1. A controllable electrophoretic fluid apparatus, said apparatus comprising at least two relatively spaced, electrically conductive members, said members movable relative to each other, an electrophoretic fluid occupying a space between said members for transmitting force between said members, wherein said fluid separates into particle-rich and particle-deficient phases in the presence of an electric field, means for forming a plurality of spaced and electrically insulating, raised surfaces affixed to at least one of said members, and means for applying an electric field between said members and to said fluid in first and second directions, wherein in said first direction said particle-rich phase occupies spaces between said raised surfaces leaving said particle-deficient phase in contact with the other of said members for decreasing the force transmission between said members by said fluid, and wherein in said second direction said particle-rich phase migrates to the other of said members and extends between said other member and said raised surfaces for increasing the force transmission between said members.

2. The apparatus according to claim 1 wherein said spaced raised surfaces comprise rib members oriented transverse to the direction of relative motion between said members.

3. The apparatus according to claim 1 wherein said spaced raised surfaces comprise an insulating material having a plurality of openings.

4. An apparatus for controlling the transmission of force between drive and driven members, said apparatus comprising at least two electrodes disposed in a spaced relationship and respectively connected to said drive and driven members, an electrophoretic fluid disposed in a space between said electrodes for transmitting force between said members and being capable of separating into a particle-rich phase and a particle-deficient phase in the presence of an electric field, means for applying an electric field between said electrodes and to said fluid in first and second directions to separate said fluid into said particle-rich phase and said particle-deficient phase, said particle-rich phase migrating to one or the other of said electrodes depending on which of said first and second directions said field is applied, means for forming a plurality of spaced and electrically insulating raised surfaces on one of said electrodes so that during application of said electric field in said first direction said particle-rich phase collects on the other of said electrodes and extends between said other electrode and said spaced raised surfaces to transmit a predetermined force between said members, and during application of said electric field in said second direction, said particle-rich phase of said fluid migrates to said one electrode and collects in the spaces between said raised surfaces to substantially reduce said force transmission.

5. The apparatus according to claim 4 wherein upon application of said electric field in said first direction said particle-rich phase collected on said other electrode lodges in at least an outer portion of said spaces between said raised surfaces for transmitting said force between said members.

6. The apparatus according to claim 4 wherein said means for forming a plurality of spaced raised surfaces comprises an electrically nonconductive material.

7. The apparatus according to claim 4 wherein said means for forming a plurality of spaced raised surfaces is in surface contact with said first electrode.

8. The apparatus according to claim 4 wherein said means for forming a plurality of spaced raised surfaces is spaced away from and connected to said one electrode.

9. The apparatus according to claim 4 wherein said means for forming a plurality of spaced raised surfaces comprises a plurality of rib members.

10. The apparatus according to claim 9 wherein said rib members are oriented perpendicular to the direction of shear of said electrophoretic fluid during movement of said electrodes relative to each other.

11. The apparatus according to claim 4 wherein said means for forming a plurality of spaced raised surfaces comprises a grid.

12. The apparatus according to claim 4 wherein said means for forming a plurality of spaced raised surfaces comprises a layer of material having a plurality of grooves.

13. The apparatus according to claim 4 wherein said means for forming a plurality of spaced raised surfaces comprises a layer of material having a plurality of openings.

14. The apparatus according to claim 13 wherein said openings are circular in shape.

15. The apparatus according to claim 13 wherein said openings are irregular in shape.

16. The apparatus according to claim 4 wherein said electric field applied to said electrophoretic fluid may vary in intensity and said force transmission varies in proportion to said intensity.

17. The apparatus according to claim 4 wherein said other electrode includes a textured surface in contact with said fluid.

18. A method for controlling the transmission of force between relatively movable elements comprising the steps of connecting electrodes to said elements, connecting spaced raised surfaces to at least one of said electrodes, confining an electrophoretic fluid between said electrodes which is separatable into particle-rich and particle-deficient phases in the presence of an electric field, and applying an electric field to said fluid between at least two of said electrodes in a first direction for causing said particle-rich phase to collect on one of said electrodes and engage the spaced raised surfaces of the other of said electrodes, thereby coupling said at least two electrodes and transmitting force between at least two of said elements.

19. The method according to claim 18 further comprising the step of applying an electric field to said fluid between said at least two electrodes in a second direction for causing said particle-rich phase to collect in the spaces between said raised surfaces on the other of said electrodes leaving said particle-deficient phase in contact with said one electrode thereby decoupling said electrodes and decreasing the transmission of force between said at least two elements.

* * * * *

UNITED STATES PATENT AND TRADEMARK OFFICE
CERTIFICATE OF CORRECTION

PATENT NO. : 5,054,593
DATED : October 8, 1991
INVENTOR(S) : J. David Carlson

It is certified that error appears in the above-identified patent and that said Letters Patent is hereby corrected as shown below:

Col. 10, line 20, change "voltage n applied" to --voltage applied--.

Col. 13, line 14, change "02" to --302--.

Signed and Sealed this

Thirtieth Day of March, 1993

Attest:

STEPHEN G. KUNIN

*Attesting Officer*  *Acting Commissioner of Patents and Trademarks*